United States Patent
Beck et al.

(10) Patent No.: US 7,230,910 B2
(45) Date of Patent: Jun. 12, 2007

(54) OPTIMAL CHANNEL SOUNDING SYSTEM

(75) Inventors: Eric C. Beck, Colts Neck, NJ (US); Markus Rupp, Floersheim (DE)

(73) Assignee: Lucent Technologies Inc., Murray Hill, NJ (US)

( * ) Notice: Subject to any disclaimer, the term of this patent is extended or adjusted under 35 U.S.C. 154(b) by 1100 days.

(21) Appl. No.: 09/772,359

(22) Filed: Jan. 30, 2001

(65) Prior Publication Data

US 2002/0101825 A1  Aug. 1, 2002

(51) Int. Cl.
*H04J 11/00* (2006.01)

(52) U.S. Cl. .................. 370/208; 370/350; 370/515; 375/367

(58) Field of Classification Search ............... 370/203, 370/204, 206, 208, 329, 335, 342; 375/140, 375/143, 146, 147, 152
See application file for complete search history.

(56) References Cited

U.S. PATENT DOCUMENTS

| | | | | |
|---|---|---|---|---|
| 5,623,511 | A * | 4/1997 | Bar-David et al. | 375/143 |
| 6,031,831 | A * | 2/2000 | Tan Boon et al. | 370/342 |
| 6,272,168 | B1 * | 8/2001 | Lomp et al. | 375/222 |
| 6,473,393 | B1 * | 10/2002 | Ariyavisitakul et al. | 370/203 |
| 6,473,467 | B1 * | 10/2002 | Wallace et al. | 375/267 |
| 6,483,866 | B1 * | 11/2002 | Suzuki | 375/149 |
| 6,661,832 | B1 * | 12/2003 | Sindhushayana et al. | 375/144 |
| 6,700,919 | B1 * | 3/2004 | Papasakellariou | 375/130 |
| 6,771,620 | B2 * | 8/2004 | Butler | 370/329 |
| 6,907,270 | B1 * | 6/2005 | Blanz | 455/562.1 |
| 2003/0137928 | A1 * | 7/2003 | Kroeger et al. | 370/206 |
| 2004/0100897 | A1 * | 5/2004 | Shattil | 370/206 |

FOREIGN PATENT DOCUMENTS

EP   0 788 260 A   8/1997

OTHER PUBLICATIONS

Liau et al, "Orthogonal LMS Algorithms For Fast Line Echo Canceller Training", *IEEE Southeastern Conference Proceedings*, Apr. 11, 1996, pp. 444-446.
Y. Chen et al, "Soft-Output Equalization and TCM For Wireless Personal Communication Systems", *IEEE Journal On Selected Areas In Communications*, vol. 16, No. 9, Dec. 1, 1998, pp. 1679-1690.

* cited by examiner

*Primary Examiner*—Chau Nguyen
*Assistant Examiner*—Rhonda Murphy
(74) *Attorney, Agent, or Firm*—Eugene J. Rosenthal

(57) ABSTRACT

A channel sounding system employs orthogonal sequences to meet the Cramer-Rao bound in estimating the channel and achieves considerable simplification of the structure necessary to perform the channel sounding. These advantages are achieved by developing orthogonal sequences of substantially arbitrary length as a function of first and second existing orthogonal sequences and using such orthogonal sequences for channel sounding in lieu of M-sequences. The techniques of the invention are especially suited to systems that use multiple antennas at the transmitter and multiple antennas at the receiver, so called multiple-input multiple-output (MIMO) systems.

38 Claims, 3 Drawing Sheets

OPTIMAL CHANNEL SOUNDING SYSTEM

TECHNICAL FIELD

This invention relates to the art of channel sounding, and more particularly, to channel sounding where the channel is linear.

BACKGROUND OF THE INVENTION

Channel sounding is the process of measuring the characteristics of a channel so as to design a communication system that best takes advantage of the determined characteristics of the channel. This is typically done by having a transmitter transmit a signal that is made up of a repeating known training sequence and then processing the signal after it has passed through the channel at a receiver to develop an estimate of the channel characteristics. It is well known in the art that the Cramer-Rao bound is the limit to which channel characteristics may be estimated using linear channel sounding techniques. One method of estimating the channel characteristics is to employ the so-called "least squares method". Doing so, gives conditions that the training sequence must meet in order to achieve the Cramer-Rao bound.

One condition that, if met, will yield a channel estimate at the Cramer-Rao bound is that the training sequence be orthogonal. However, the art was typically only aware of orthogonal sequences that were very short, e.g., no greater than 16 symbols, or several sequences that were much longer, at lengths of $(2^n)^2$, where n in an integer. The use of the known short sequences was of no value, because they cannot be used to measure channels with large delay spread, such as is required for wideband communication. The use of the known long sequences was also of no value, because they require complicated modulation schemes that are not practical to implement. Thus orthogonal sequences were not used in the art and no practical study was devoted to the use of orthogonal sequences for channel sounding.

Instead, so-called "M-sequences", which are pseudo-orthogonal sequences, have become the pervasive sequences that are employed for channel sounding. These M-sequences have been extensively studied, with much literature being devoted to them and their use in channel sounding. Thus, the entire mindset of the art was to not employ orthogonal sequences, which were dismissed as impractical.

The signals conveyed in data transmission systems generally are not periodic and occupy infinite bandwidth. In order to limit the occupied bandwidth, the transmitted signals are filtered by a channel or pulse shaping filter. Channel filters are also referred to by those of skill in the art as pulse shaping filters.

Because M-sequences are not actually orthogonal, it is common practice in the art to apply a channel filter similar to those applied to data transmission systems when using M-sequences for channel sounding applications. Disadvantageously, this adds to the cost of the system.

As described therein an orthogonal training sequence can be developed for a channel that is described as a finite impulse response (FIR) filter .having a length $M_{new}$ from the already existing orthogonal training sequences for at least two channels that have respective lengths $M_{old1}$ and $M_{old2}$ each that is less than $M_{new}$ such that the product of $M_{old1}$ and $M_{old2}$ is equal to $M_{new}$ when $M_{old1}$ and $M_{old2}$ have no common prime number factor. More specifically, a set of initial existing orthogonal training sequences is found, e.g., using those that were known in the prior art or by performing a computer search over known symbol constellations given a channel of length M. Thereafter, an orthogonal training sequence of length $M_{new}$ is developed, where the product of $M_{old1}$ and $M_{old2}$ is equal to $M_{new}$ by repeating the training sequence old1 $M_{old2}$ number of times to form a first concatenated sequence and repeating the training sequence old2 $M_{old1}$ number of times to form a second concatenated sequence, so that both the first concatenated sequence and the second concatenated sequence have the same length. Each term of the first concatenated sequence is multiplied by the correspondingly located term in the second concatenated sequence which is placed in the same location in a new sequence made up of the resulting $M_{new}$ products. This new sequence is an orthogonal sequence of length $M_{new}$. If there is more than one existing orthogonal sequence for a particular length channel, e.g., there may be different orthogonal sequences for different modulation schemes for the same length channel, the implementer may choose which ever orthogonal sequence gives the results desired. Often, for practical applications, the result that yields the modulation scheme that is most suitable for use with the actual channel, which may yield the highest speeds, or the result that yields the smallest alphabet, which would reduce the hardware required for implementation, is desirable.

A popular channel filter that is often used as the channel filter in channel sounding systems that employ M-sequences is the raised cosine filter, a filter that is usually applied in matched pairs, i.e., one at the transmitter and one at the receiver, for various well known technical reasons. In practice these channel filters can only be approximated, and thus the ultimate performance of the communication system is limited.

Channel filtering should not be confused with the reconstruction filtering which takes place when discrete time signals, e.g., digital signals, are converted to continuous time, e.g., analog, signals. The reconstruction filter eliminates the spectral replicas appearing in the continuous time reconstruction of a discrete time signal. The technical requirements placed on the reconstruction filter, e.g., cut off rate and ultimate attenuation can be quite severe. Therefore it is common practice to interpolate the discrete time signal to ease the requirements on the reconstruction filter.

Clearly then, in general, it is the role of the channel filter to define the signal bandwidth while the reconstruction filter assists in the digital to analog conversion process.

SUMMARY OF THE INVENTION

We have recognized that the use of periodic orthogonal sequences can not only allow the Cramer-Rao bound to be met in estimating the channel, but they permit considerable simplification of the structure necessary to perform the channel sounding. For example the implementation of the least-square method can be simplified, and post filtering to improve the quality of the estimate can also be simplified.

We have also recognized that the channel filtering, e.g., raised cosine filtering, performed in the prior art when M-sequences were transmitted is unnecessary when using orthogonal sequences according to the invention due to the periodic nature of the orthogonal sequences employed. This is because a periodic sequence is represented perfectly by a Fourier series without approximation. Therefore the interpolation performed to facilitate reconstruction to a continuous time, e.g. analog, signal can be computed perfectly in the frequency domain as an extension of the Fourier series describing the sequence, followed by an inverse Fourier series transform to express the sequence in the time domain.

The interpolation may also be done just as accurately in the time domain because of the duality between the frequency and time domains.

The periodic orthogonal sequences are generated by using the techniques disclosed in the previously filed copending application Ser. No. 09/648,983—which is incorporated by reference as if fully set forth herein—to develop orthogonal sequences of substantially arbitrary length as a function of first and second existing orthogonal sequences and using such orthogonal sequences for channel sounding in lieu of M-sequences.

The techniques of the invention are especially suited to systems that use multiple antennas at the transmitter and multiple antennas at the receiver, these being so called multiple-input multiple-output (MIMO) systems.

DETAILED DESCRIPTION

Figure 1:
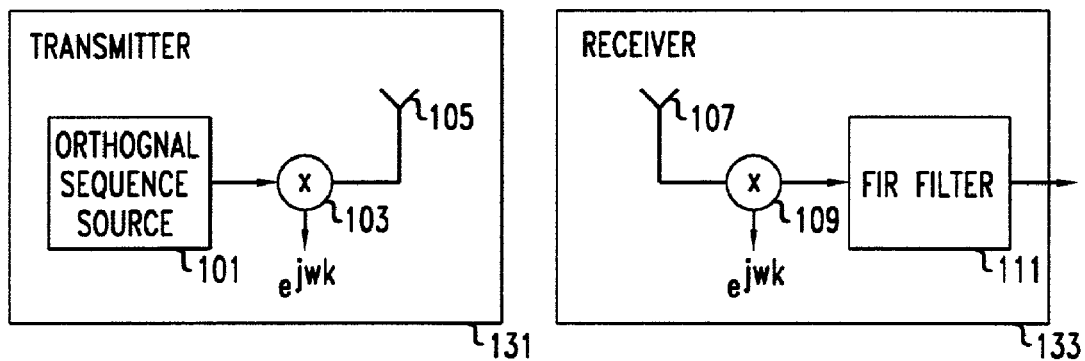
FIG. 1 shows a channel sounding system in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS., are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

FIG. 1 shows a channel sounding system, including transmitter 131 and receiver 133, in accordance with the principles of the invention. Transmitter 131 includes a) orthogonal sequence source 101, b) modulator 103, and c) optional antenna 105. Receiver 133 includes a) optional antenna 107, b) demodulator 109, and c) finite impulse response (FIR) filter 111.

Orthogonal sequence source 101 supplies a training signal that is made up of a repeating base orthogonal sequence. In accordance with the principles of the invention, the base orthogonal sequence that is repeated may have a substantially arbitrary length so long as it is least as long as the channel length, e.g., it is generated by using the techniques disclosed in the previously filed copending application Ser. No. 09/648,983—which is incorporated by reference as if fully set forth herein—, i.e., the orthogonal sequence is a function of first and second existing orthogonal sequences. In the discrete time domain, the base orthogonal sequence has a perfectly white spectrum within the bandwidth of the sequence. Once interpolated the spectral energy outside the bandwidth of the sequence is, ideally, zero. When converted into the continuous time domain the spectrum appears as a line spectrum as the sequence is repeated an infinite number of times. Note that the interpolated sequence is still a periodic orthogonal sequence. Orthogonal sequence source 101 may be a memory that stores the base orthogonal sequence and supplies it as an output in a repetitious manner. Alternatively, orthogonal sequence source 101 may continuously generate the orthogonal sequence using computation techniques.

Modulator 103 receives as input the training signal as it is supplied by orthogonal sequence source 101. In accordance with an aspect of the invention, the training signal is supplied to modulator 103 directly from orthogonal sequence source 101 without any filtering being performed between orthogonal sequence source 101 and modulator 103. Modulator 103 modulates the training signal using a carrier signal $e^{jwk}$ that is also received as an input by modulator 103. The modulated training signal is supplied as an output by modulator 103, e.g., to optional antenna 105. Optional antenna 105 broadcasts the modulated training signal as a wireless signal.

Optional antenna 107 receives the wireless signal broadcast by optional antenna 105 and converts it to a modulated received training signal in electrical form. The modulated received training signal in electrical form is supplied to demodulator 109, which demodulates it to baseband using a local carrier signal $e^{jwk}$ that is also received as an input by demodulator 109. The baseband demodulated received training signal is supplied by demodulator 109 as an output to FIR filter 111. In accordance with an aspect of the invention, there is no filtering performed between demodulator 109 and FIR filter that corresponds to any filtering performed in transmitter 131. However, as will be further described hereinbelow, filtering that is independent of any filtering performed in transmitter 131 may be performed between demodulator 109 and FIR filter 111.

In accordance with an aspect of the invention, FIR filter 111 performs least-squares processing on the baseband demodulated received training signal. FIR filter 111 supplies as an output a channel estimate, e.g., a sequence of values that specify the channel's impulse response. Advantageously, the channel estimate is the best estimate that can be achieved using linear estimation techniques since it meets the Cramer-Rao bound given the observation period.

Figure 2:
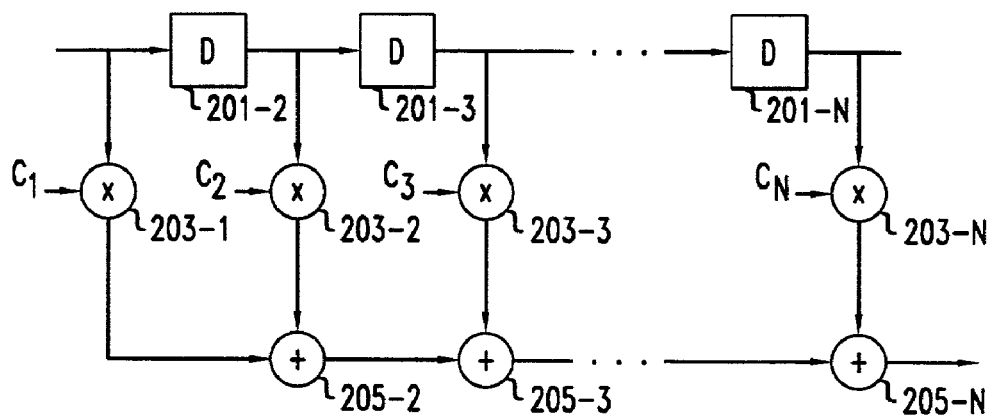
FIG. 2 shows an exemplary structure of FIR filter of FIG. 1, in accordance with the principles of the invention.

FIG. 2 shows an exemplary structure of FIR filter 111 for performing least-squares processing on the baseband demodulated received training signal, in accordance with the principles of the invention. Shown in FIG. 2 are a) N-1 delay elements 201, including delay elements 201-2 through 201-N; b) N multipliers 203, including multipliers 203-1 through 203-N; and c) N-1 adders 205, including adders 205-2 through 205-N, where N is the number of symbols in the base orthogonal sequence. Note that FIR filter 111 has a conventional structure of an FIR filter. Each symbol of the baseband demodulated received training signal is initially supplied to the first delay element, delay element 201-2, as well as to the first multiplier, multiplier 203-1. For each clock cycle the symbol stored in each delay element is supplied to the next delay element in the delay chain formed by delay elements 201 until delay element 201-N, after which the symbol exits the filter. The symbol stored in each of delay elements 201 is multiplied, using a corresponding one of multipliers 203, by a coefficient value. Additionally, the symbol currently being supplied as an output by demodulator 109 is multiplied by a coefficient using multiplier 203-1. The various products produced by multipliers 203 are summed using adders 205 and an output of the FIR filter is supplied from adder 205-N.

In accordance with an aspect of the invention, the coefficient values $C_1$ through $C_N$ supplied to each of multipliers 203 corresponds to the complex conjugate of one of the symbols of the base orthogonal sequence. More specifically, multiplier 203-1 is supplied with the complex conjugate of the last symbol of the base orthogonal sequence, multiplier 203-2 is supplied with the complex conjugate of the next to last symbol of the base orthogonal sequence, and so on, with multiplier 203-N being supplied with the complex conjugate of the first symbol of the base orthogonal sequence. Advantageously, the structure of FIR filter 111 is considerably simpler than the structure required to implement a general purpose least-squares process.

Figure 3:
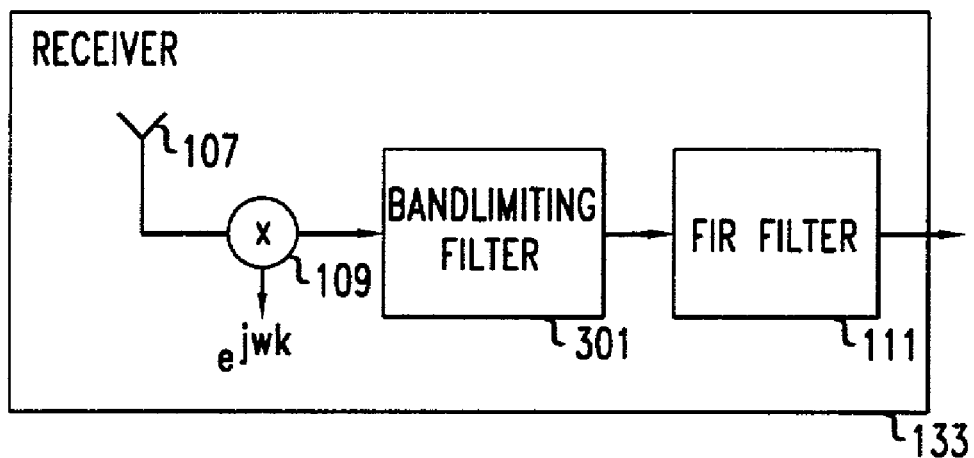
FIG. 3 shows an exemplary embodiment of the receiver of FIG. 1 but in which a band-limiting filter is interposed between the demodulator and the FIR filter.

FIG. 3 shows an exemplary embodiment of receiver 133 but in which band-limiting filter 301 is interposed between demodulator 109 and FIR filter 111. Note that in accordance with the principles of the invention, no such bandlimiting filter, or any corresponding filter for that matter, exists in the transmitter between orthogonal sequence source 101 and modulator 103, i.e., the transmitter is exactly the same as transmitter 131 as shown in FIG. 1. The purpose of band-limiting filter 301 is to eliminate any out-of-band noise that may have been introduced into the baseband demodulated received training signal at receiver 133 prior to being supplied to FIR filter 111. Theoretically such a filter is not required but as a matter of practicality it is good practice to include such a filter. In other words, band-limiting filter 301 reduces out-of-band emissions that creep into the system but are not inherently caused by operation of orthogonal sequence source 101 or modulator 103.

Figure 4:
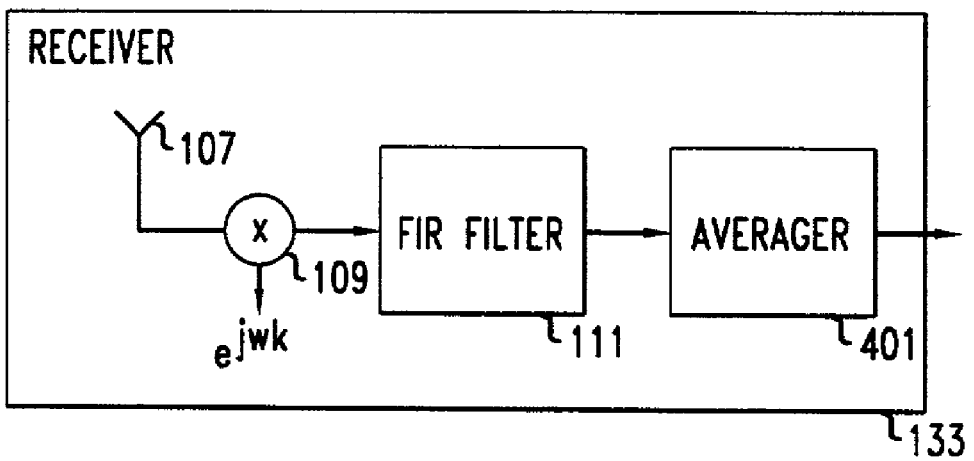
FIG. 4 shows an exemplary embodiment of the receiver of FIG. 1 but in which an averager is coupled to receive the output of the FIR filter.

FIG. 4 shows an exemplary embodiment of receiver 133 but in which averager 401 is coupled to receive the output of FIR filter 111. Averager 401 develops the average of channel estimates produced by FIR filter 111. Such an average estimate tends to be more accurate. Furthermore, since the observation time is increased, the Cramer-Rao bound is still met.

Note that once the modulated orthogonal sequence is developed, it may be recorded and played back at a later time for channel sounding purposes. This recording and playback may be performed either before or after the modulated orthogonal signal passes through the channel.

The techniques of the invention are especially suited to systems that uses multiple antennas at the transmitter and multiple antennas at the receiver, so called multiple-input multiple-output (MIMO) systems. In particular, once a base orthogonal sequence is developed, the sequence is offset by a different amount for each transmit antenna. For example, each sequence could be offset by a multiple of the channel length for each transmit antenna, where the multiple ranges from 0 to M-1, where M is the number of transmit antennas. Furthermore, by not using exactly the same amount of offset shifting for each transmit antenna, e.g., not having each signal offset by exactly the channel length, but keeping the overall total shifting the same, e.g., the average of all of the shifts is the channel length, it is possible to determine at a receiver from which transmit antenna a particular signal originated.

Figure 5:
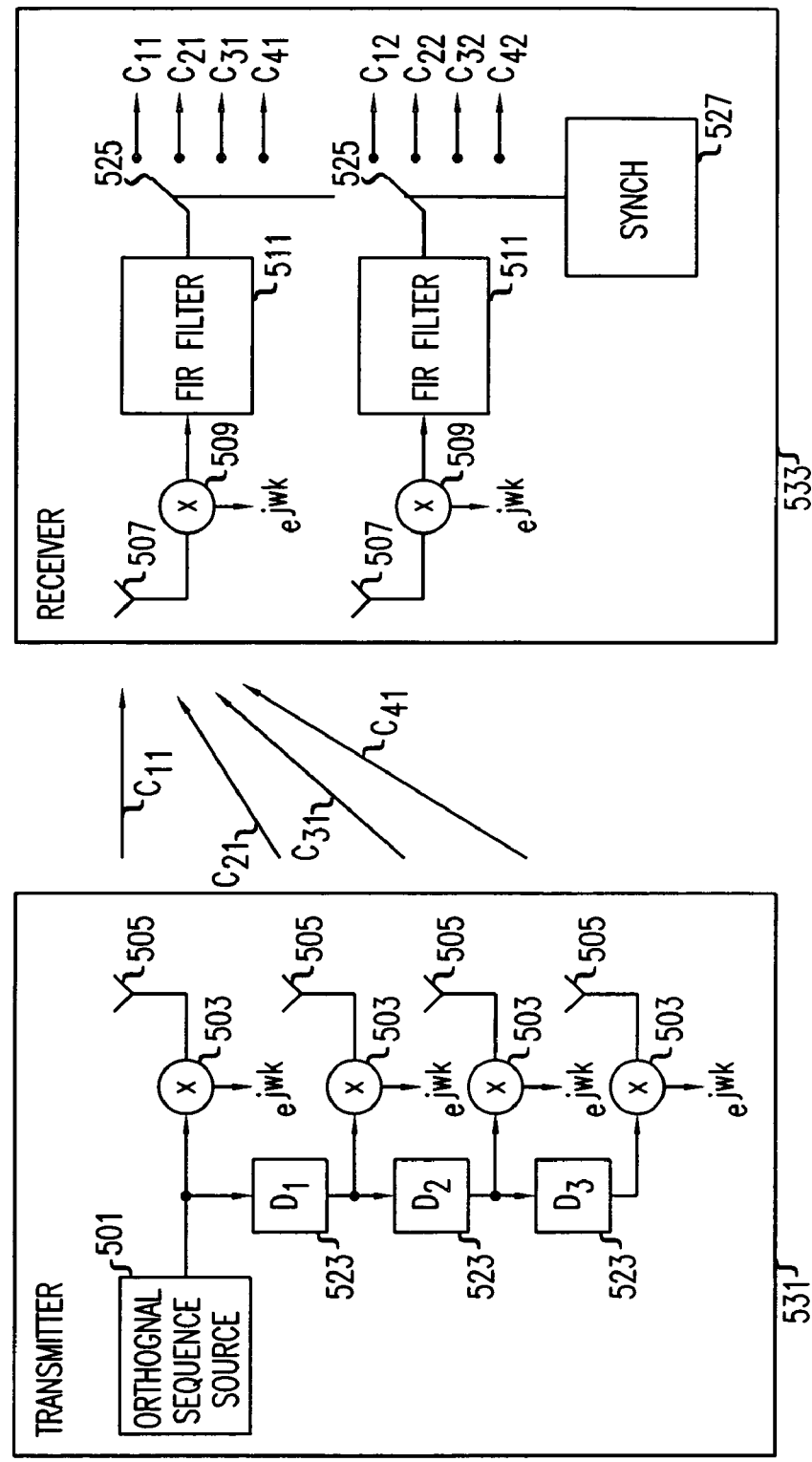
FIG. 5 shows an exemplary embodiment of the invention for a MIMO system.

More specifically, FIG. 5 shows an exemplary embodiment of the invention for a MIMO system. FIG. 5 shows transmitter 531 and receiver 533, where transmitter 531 has 4 transmit elements and 2 receive elements, to effectively create 8 channels $C_{11}$ through $C_{41}$ and $C_{12}$ through $C_{42}$, only the former of which are shown being transmitted for the sake of clarity. Similar to transmitter 131 (FIG. 1) transmitter 531 includes a) orthogonal sequence source 501, b) modulators 503, c) optional antennas 505, and d) delay elements 523. Receiver 533 includes a) optional antennas 507, b) demodulators 509, c) finite impulse response (FIR) filters 511, d) demultiplexers 525, and e) synchronization controller (SYNCH) 527.

Essentially the same as orthogonal sequence source 101 (FIG. 1), orthogonal sequence source 501 supplies a training signal that is made up of a repeating base orthogonal sequence. In accordance with the principles of the invention, the base orthogonal sequence that is repeated may have a substantially arbitrary length and should be as least as long as the channel length times the number of transmit elements.

Delay elements 523 form a delay chain, so that the output of each of delay elements 523 is a delayed version of the orthogonal sequence supplied by orthogonal sequence source 501. The delays of each of delay elements 523 may be identical, but they need not be so. In fact, if identical delays are not employed, then, as noted above, it is possible to determine at receiver 533 from which transmit element a particular signal originated Each of modulators 503 receives as input respective one of either the training signal as it is supplied by orthogonal sequence source 501 or one of the delayed versions supplied by delay elements 523. In accordance with an aspect of the invention, the training signal is supplied to modulators 503 without any filtering being performed between orthogonal sequence source 501 and modulator 503. Modulator 503 modulates each of the original or delayed training signals using a carrier signal $e^{jwk}$ that is also received as an input by each of modulators 503 to produce modulated training signals. The modulated training signals are supplied as an output by each modulator 503, e.g., to a respective one of optional antennas 505. Each of optional antenna 505 broadcasts its modulated training signal as a wireless signal.

Each of optional antennas 507 receives the wireless signals broadcast by each of optional antennas 505 and converts it to a respective modulated received training signal in electrical form. Each of the modulated received training signals in electrical form is supplied to the one of demodulators 509 associated with the antenna, which demodulates it to baseband using a local carrier signal $e^{jwk}$ that is also received as an input by demodulators 509. The baseband demodulated received training signals are each supplied by demodulators 509 as an output to respective associated FIR filters 511. In accordance with an aspect of the invention, there is no filtering performed between demodulators 509 and FIR filters 511 that corresponds to any filtering performed in transmitter 531.

In accordance with an aspect of the invention, each of FIR filters 511 performs least-squares processing on the baseband demodulated received training signal it receives. To this end, each of FIR filters 511 uses a coefficients the complex conjugates of the base orthogonal sequence in the same manner as described above in connection with FIG. 2. Each of FIR filters 511 supplies as an output a series of channel estimates, one for each of the transmit elements. The channel estimates repeat in a pattern corresponding to the values of delays 523. Advantageously, the channel estimate is the best estimate that can be achieved using linear estimation techniques since it meets the Cramer-Rao bound given the observation period.

Demultiplexers 525 are responsive to timing signals from synchronization controller 527 so as to separate and supply as separate outputs each of the channel estimates produced by each of FIR filters 511.

What is claimed is:

1. A transmitter for use in performing channel sounding, comprising:
    a source of an orthogonal sequence which is repeatedly supplied, said orthogonal sequence having been developed as a function of first and second existing orthogonal sequences and being such that said orthogonal sequence would have a perfectly white spectrum were said orthogonal sequence to be repeated an infinite number of times; and
    a modulator for producing a modulated signal by modulating a carrier signal by said orthogonal sequence, said modulator being coupled to said source;
    whereby no channel filtering is required between said source and said modulator to reduce out-of-band emissions caused by said source.

2. The invention as defined in claim 1 wherein said source of an orthogonal sequence is a memory which stores said orthogonal sequence.

3. The invention as defined in claim 1 wherein said source of an orthogonal sequence is a sequence generator.

4. The invention as defined in claim 1 further comprising an antenna coupled to said modulator for broadcasting said modulated signal.

5. The invention as defined in claim 1 wherein no filtering is performed between said source and said modulator.

6. A transmitter for use in performing channel sounding, comprising:
    means for repeatedly supplying an orthogonal sequence that is a function of first and second existing orthogonal sequences and has a perfectly white spectrum should said orthogonal sequence be repeated an infinite number of times; and
    means for modulating a carrier signal by said orthogonal sequence, said means for modulating being coupled to said means for repeatedly supplying;
    whereby no channel filtering to reduce out-of-band emissions caused by said means for supplying is required between said means for repeatedly supplying and said means for modulating.

7. The invention as defined in claim 6 wherein said means for repeatedly supplying is a memory which stores said orthogonal sequence.

8. The invention as defined in claim 6 wherein said means for repeatedly supplying is a sequence generator.

9. The invention as defined in claim 6 further comprising means for broadcasting said modulated signal.

10. A receiver for use in performing channel sounding, comprising:
    a demodulator for demodulating a received version of an orthogonal sequence that modulates a carrier and which is repeated at least once and was derived as a function of first and second existing orthogonal sequences to produce a baseband demodulated received orthogonal sequence; and
    a finite impulse response (FIR) filter implementing a least squares algorithm to produce a channel estimate, said FIR filter being coupled to receive said demodulated received orthogonal sequence from said demodulator;
    whereby no channel filtering is performed between said demodulator and said FIR filter to reduce out-of-band noise inherently resulting from an orthogonal sequence that modulated a carrier for transmission by a transmitter to ultimately become said received version after passing through a channel and being received.

11. The invention as defined in claim 10 wherein coefficients of said FIR filter are complex conjugate values of said orthogonal sequence.

12. The invention as defined in claim 10 further comprising an averager for averaging a plurality of channel estimates produced by said FIR filter.

13. The invention as defined in claim 10 further comprising a bandlimiting filter coupled between said demodulator and said FIR filter for reducing out-of-band noise that was introduced into said baseband demodulated received orthogonal sequence through said channel or at said receiver.

14. The invention as defined in claim 10 further comprising means for receiving a wirelessly broadcast version of said modulated version of a orthogonal sequence and converting said modulated version of said orthogonal sequence into an electrical representation.

15. A system for use in performing channel sounding, comprising:
a transmitter, said transmitter including
a source of an orthogonal sequence which is repeatedly supplied as an output, said orthogonal sequence (i) having been developed as a function of first and second existing orthogonal sequences and (ii) having a perfectly white spectrum when repeated an infinite number of times;
a modulator for modulating a carrier signal by said orthogonal sequence, said modulator being coupled to said source;
whereby no channel filtering is required between said source and said modulator to reduce out-of-band emissions caused by said source; and
a receiver including
a demodulator for demodulating a received modulated version of said orthogonal sequence that modulates a carrier and was transmitted by said transmitter;
a finite impulse response (FIR) filter implementing a least squares algorithm for developing an estimate of the channel characteristic, said FIR filter being coupled to receive said demodulated orthogonal sequence from said demodulator;
whereby no channel filtering is performed between said demodulator and said FIR filter to reduce out-or-band noise inherently resulting from said orthogonal sequence prior to its being supplied to said modulator.

16. The invention as defined in claim 15 wherein said demodulated training sequence is filtered using a band-limiting filter to eliminate out of band noise picked up at said receiver prior to being received by said FIR filter, there being no such band-limiting filter in said transmitter.

17. The invention as defined in claim 15 wherein said receiver further comprises an averaging filter for averaging said estimate of the channel characteristic developed by said FIR filter.

18. A transmitter for use in performing channel sounding, comprising:
a supplier of a plurality of orthogonal sequences each of which is a version of an original orthogonal sequence, each of said plurality of orthogonal sequences being repeatedly supplied, said original orthogonal sequence having been developed as a function of first and second existing base orthogonal sequences and having a perfectly white spectrum should said original orthogonal sequence be repeated an infinite number of times; and
a plurality of modulators for producing a plurality of modulated signals by modulating a carrier signal by said each of said plurality of orthogonal sequences, said modulators being coupled to said supplier so that no channel filtering to reduce out-of-band emissions caused by any of said orthogonal signals is performed on said orthogonal sequence between said supplier and any of said modulators.

19. The invention as defined in claim 18 wherein said supplier of a plurality of orthogonal sequences comprises a source of said original orthogonal sequence and at least one delaying element.

20. The invention as defined in claim 18 wherein said plurality of orthogonal sequences include at least said original orthogonal sequence and at least one delayed version of said original orthogonal sequence.

21. The invention as defined in claim 18 further comprising a plurality of antennas, each of said antennas being coupled to a respective one of said modulators.

22. The invention as defined in claim 18 wherein said plurality of orthogonal sequences include at least said original orthogonal sequence and at least two delayed version of said original orthogonal sequence, wherein the delay between each orthogonal sequence of said plurality of orthogonal sequences is substantially equal.

23. The invention as defined in claim 18 wherein said plurality of orthogonal sequences include at least said original orthogonal sequence and at least two delayed version of said original orthogonal sequence, wherein the delay between each orthogonal sequence of said plurality of orthogonal sequences is not substantially equal.

24. A system for use in performing channel sounding, comprising:
a transmitter, said transmitter including
a source of an orthogonal sequence which is repeatedly supplied as an output, said orthogonal sequence having been developed as a function of first and second existing orthogonal sequences and having a perfectly white spectrum should said original orthogonal sequence be repeated an infinite number of times;
a modulator for modulating a carrier signal by said orthogonal sequence, said modulator being coupled to said source;
whereby no channel filtering is required between said source and said modulator to reduce out-of-band emissions; and
a receiver including
a demodulator for demodulating a received modulated version or said orthogonal sequence thin modulates a carrier and was transmitted by said transmitter;
a finite impulse response (FIR) filter implementing a least squares algorithm for developing an estimate of the channel characteristic, said FIR filter being coupled to receive said demodulated orthogonal sequence from said demodulator without passing through a filter that has a corresponding filter function in said transmitter.

25. A transmitter for use in performing channel sounding, comprising:
means for repeatedly supplying a plurality of orthogonal sequences that are each a version of an original orthogonal sequence that is a function of first and second existing basic orthogonal sequences, each of said plurality of orthogonal sequences having a perfectly white spectrum when repeated an infinite number of times; and
means for modulating each of a plurality of identical carrier signals by a respective one of said plurality of orthogonal sequences, each of said means for modulating being coupled to said means for repeatedly supplying so that no channel filtering to reduce out-of-band emissions is performed on any of said plurality of orthogonal sequences between said source and said modulator.

26. The invention as defined in claim 25 further comprising a plurality of means for broadcasting said modulated signal each of said means for broadcasting being coupled to a respective one of said means for modulating.

27. The invention as defined in claim 25 wherein said plurality of orthogonal sequences include at least said original orthogonal sequence and at least two delayed version of said original orthogonal sequence1 wherein the delay between each orthogonal sequence of said plurality of orthogonal sequences is substantially equal.

28. The invention as defined in claim 25 wherein said plurality of orthogonal sequences include at least said original orthogonal sequence and at least two delayed version of said original orthogonal sequence, wherein the delay between each orthogonal sequence of said plurality of orthogonal sequences is not substantially equal.

29. A receiver for use in performing channel sounding, comprising:
   a plurality of demodulators, each of said demodulators demodulating a respective plurality of received versions of an original orthogonal sequence that each modulates a carrier and which is repeated at least once and was derived as a function of first and second existing basic orthogonal sequences; and
   a plurality of finite impulse response (FIR) filters implementing a least squares algorithm to produce a plurality of channel estimates, one for each of said received versions of said original orthogonal sequence of said plurality, each of said FIR filters being coupled to receive its respective plurality of demodulated orthogonal sequences from a respective one of said demodulators without any channel filtering to reduce out-of-band emissions inherently resulting from said versions of said original orthogonal sequence that modulated said carrier to ultimately become said received versions after passing through a channel and being received being performed between said demodulator and said respective associated FIR filter.

30. The invention as defined in claim 29 further comprising a demultiplexer for separating out each channel estimate supplied as an output by the one of said FIR filters to which said demultiplexer is coupled.

31. The invention as defined in claim 29 further comprising a bandlimiting filter coupled between at least one of said demodulators and its associated respective one of said FIR filters for reducing out-of-hand noise that was introduced into said baseband demodulated received orthogonal sequence through said channel or at said receiver.

32. The invention as defined in claim 29 further comprising an averager for averaging a plurality of channel estimates produced by the one of said FIR filters to which said averager is coupled.

33. A receiver for use in performing channel sounding, comprising:
   means for demodulating a received version of an orthogonal sequence that modulates a carrier and which is repeated at least once and was derived as a function of first and second existing orthogonal sequences; and
   means for implementing a least squares algonthrn using unite impulse response (FIR) filtering to produce a channel estimate, said means for implementing being coupled to receive said demodulated orthogonal sequence from said means for demodulating without any channel filtering being performed between said means for demodulating and said means for implementing.

34. A system for use in performing channel sounding, comprising:
   a transmitter, said transmitter including
      a supplier of a plurality of orthogonal sequences each of which is a version of an original orthogonal sequence, each or said plurality of orthogonal sequences being repeatedly supplied, said original orthogonal sequence (i) having been developed as a function of first and second existing base orthogonal sequences and (ii) having a perfectly white spectrum when repeated an infinite number of limes; and
      a plurality of modulators for producing a plurality of modulated signals by modulating a carrier signal by said each of said plurality of orthogonal sequences, said modulators being coupled to said source so that no channel filtering to reduce out-or-band emissions caused by said orthogonal sequences is performed on said orthogonal sequences between said supplier and said modulators; and
   a receiver including
      a plurality of demodulators, each of said demodulators demodulating a respective plurality of received versions of said original orthogonal sequence that each modulates said carrier; and
      a plurality of finite impulse response (FIR) filters implementing a least squares algorithm to produce a plurality of channel estimates, one for each of said received versions of said original orthogonal sequence of said plurality, each of said FIR filters being coupled to receive its respective plurality of demodulated orthogonal sequences from a respective one of said demodulators without any channel filtering to reduce out-of-band emissions inherently resulting from said versions of said original orthogonal sequence that modulated said carrier to ultimately become said received versions after passing through a channel and being received being performed between said demodulator and said respective associated FIR filter.

35. The invention as defined in claim 34 further comprising a plurality of demultiplexers, each of said demultiplexers separating out each channel estimate supplied as an output by the one of said FIR filters to which it is coupled.

36. The invention as defined in claim 34 further, comprising a bandlimiting filter coupled between at least one of said demodulators and its associated respective one of said FIR filters for reducing out-of-hand noise limit was introduced into said baseband demodulated received orthogonal sequence through said channel or at said receiver.

37. A method for use in performing channel sounding, comprising the steps of:
   repeatedly supplying an orthogonal sequence that (i) is a function of first and second existing orthogonal sequences and (ii) has a perfectly white spectrum when repeated an infinite number of times;
   modulating a carrier signal by said orthogonal sequence, said modulating being performed by a means for modulating that is coupled to a means for performing said repeatedly supplying step;
   whereby no channel filtering to reduce out-of-bound emissions is required between said means for repeatedly supplying and said means for modulating; and
   recording said modulated carrier signal.

38. The invention as defined in claim 37 further comprising the stop of playing back said recorded modulated carrier signal.

* * * * *